United States Patent [19]

Wilson et al.

[11] Patent Number: 5,212,032

[45] Date of Patent: May 18, 1993

[54] MOISTURE STABLE POLYURETHANE BIASABLE TRANSFER MEMBERS

[75] Inventors: John C. Wilson, Rochester; William B. Vreeland, Webster, both of N.Y.

[73] Assignee: Eastman Kodak Company, Rochester, N.Y.

[21] Appl. No.: 798,432

[22] Filed: Nov. 26, 1991

[51] Int. Cl.$^5$ ............................................. G03G 13/16
[52] U.S. Cl. ..................................... 430/65; 430/126; 355/274
[58] Field of Search .................... 430/126, 66, 67; 428/425.8; 355/274

[56] References Cited

U.S. PATENT DOCUMENTS

| | | | |
|---|---|---|---|
| 2,807,233 | 9/1957 | Fitch | 118/637 |
| 2,836,725 | 5/1958 | Vyververg | 250/49.5 |
| 2,951,443 | 9/1960 | Byrne | 101/426 |
| 2,969,386 | 1/1961 | McElroy | 260/471 |
| 3,379,687 | 4/1968 | Doss et al. | 260/47 |
| 3,455,855 | 7/1969 | Houghton et al. | 260/18 |
| 3,520,604 | 7/1970 | Shelffo | 355/16 |

(List continued on next page.)

FOREIGN PATENT DOCUMENTS

| | | |
|---|---|---|
| 2820609 | 11/1979 | Fed. Rep. of Germany . |
| 3223119 | 12/1983 | Fed. Rep. of Germany . |
| 2568574 | 7/1984 | France . |
| 4927675 | 7/1974 | Japan . |
| 2218471 | 1/1991 | Japan . |
| 1071627 | 3/1982 | U.S.S.R. . |
| 2143539 | 7/1984 | United Kingdom . |
| 2205437 | 4/1987 | United Kingdom . |
| WO9100314 | 1/1991 | World Int. Prop. O. . |

OTHER PUBLICATIONS

Sieger, H. "Stoichiometric Alkaline Earth Salt Complexes of Ethylene Glycols" Tetrahedren Letters, No. 30, pp. 2709–2710, Pergamon Press Ltd. (1978).

Chemical Abstracts, vol. 88, 1978, p. 44, Abstract No.

*Primary Examiner*—John Goodrow
*Attorney, Agent, or Firm*—Willard G. Montgomery

[57] ABSTRACT

The invention provides rolls, belts and other biasable members having at least one layer or coating of an elastomeric resilient polyurethane formed by reacting (a) a polyisocyanate prepolymer comprising the reaction product of a saturated aliphatic polyisocyanate, a saturated cycloaliphatic polyisocyanate, or an aromatic polyisocyanate and a polyol free of aliphatic unsaturation, preferably a polyalkylene glycol in which the alkylene group contains 2 to 8 carbon atoms, and (b) a hardening mixture comprising a polyol of (a) or a diamine free of aliphatic unsaturation, or a mixture thereof and, as a conductivity control agent, from 0.001 to 5.0 weight percent, based on the total weight of (b), of a complex of ethylene glycil or an oligoethylene glycol selected from the group consisting of di-, tri- and tetraethylene glycol with an ionizable ferric halide salt selected from the group consisting of ferric flouride, ferric chloride and ferric bromide.

32 Claims, 1 Drawing Sheet

U.S. PATENT DOCUMENTS

| | | |
|---|---|---|
| 3,552,972 | 1/1971 | Meyer et al. .............................. 96/87 |
| 3,608,792 | 9/1971 | Hudson ................................. 222/407 |
| 3,620,616 | 11/1971 | Davidson et al. ......................... 355/3 |
| 3,633,543 | 1/1972 | Pitasi et al. ............................. 118/621 |
| 3,694,413 | 9/1972 | Batzer et al. ..................... 260/75 NA |
| 3,702,482 | 11/1972 | Dolcimascolo et al. ....... 346/74 ES |
| 3,708,482 | 1/1973 | Lauria et al. ...................... 260/247.7 |
| 3,740,379 | 6/1973 | Sebenda et al. ................... 260/78 L |
| 3,743,684 | 3/1973 | Johnson et al. ................. 260/681.5 |
| 3,769,022 | 10/1973 | Ville et al. ......................... 96/114.5 |
| 3,781,105 | 12/1973 | Meagher ................................. 355/3 |
| 3,860,611 | 1/1975 | Krespan .............................. 260/338 |
| 3,920,325 | 11/1975 | Swift ................................. 355/3 R |
| 3,954,332 | 5/1976 | Fisher ............................... 355/3 R |
| 3,959,573 | 5/1976 | Eddy et al. ......................... 428/425 |
| 3,959,574 | 5/1976 | Seanor et al. ...................... 428/425 |
| 3,969,306 | 7/1976 | Borman et al. .................... 260/33.6 |
| 4,058,879 | 11/1977 | Lentz et al. ........................... 29/132 |
| 4,062,812 | 12/1977 | Safford et al. ...................... 252/500 |
| 4,066,352 | 1/1978 | Kameda et al. .................... 355/31 E |
| 4,113,649 | 9/1978 | Lehmkul et al. ................ 252/363.5 |
| 4,116,894 | 9/1978 | Lentz et al. ........................... 521/94 |
| 4,177,335 | 12/1979 | Austin et al. ......................... 521/171 |
| 4,182,909 | 1/1980 | Angstadt et al. ................... 568/574 |
| 4,200,701 | 4/1980 | Wetton et al. ........................... 525/4 |
| 4,272,616 | 6/1981 | Kishimoto ........................... 430/529 |
| 4,303,748 | 12/1981 | Armand et al. ..................... 429/192 |
| 4,309,803 | 1/1982 | Blaszak ................................. 29/130 |
| 4,357,401 | 11/1982 | Andre et al. ........................ 429/192 |
| 4,365,036 | 12/1982 | Lee ....................................... 524/275 |
| 4,390,679 | 6/1983 | Weiss et al. ........................... 528/64 |
| 4,404,408 | 9/1983 | Wirth et al. ......................... 568/680 |
| 4,405,741 | 9/1983 | Lee ....................................... 524/299 |
| 4,407,739 | 10/1983 | Naarmann et al. ................. 252/512 |
| 4,436,841 | 3/1984 | Rasshofer et al. ................. 521/106 |
| 4,438,251 | 3/1984 | Herweh ................................. 528/73 |
| 4,456,548 | 6/1984 | Lewis et al. ......................... 252/500 |
| 4,471,037 | 9/1984 | Bannister ............................ 429/191 |
| 4,476,292 | 10/1984 | Ham et al. ............................. 528/60 |
| 4,476,297 | 10/1984 | Kablitz et al. ....................... 528/486 |
| 4,542,095 | 9/1985 | Steklenski et al. .................. 430/527 |
| 4,547,440 | 10/1985 | Hopper et al. ....................... 429/112 |
| 4,548,737 | 10/1985 | Ballard et al. ....................... 252/500 |
| 4,556,614 | 12/1985 | le Mehaute et al. ................ 429/191 |
| 4,618,454 | 10/1986 | Ballard et al. ....................... 252/500 |
| 4,654,267 | 3/1987 | Ugelstad et al. .................... 428/407 |
| 4,654,279 | 3/1987 | Bauer et al. ......................... 429/192 |
| 4,698,391 | 10/1987 | Yacobucci et al. ................. 525/162 |
| 4,729,925 | 3/1988 | Chen et al. ....................... 428/425.8 |
| 4,762,941 | 8/1988 | Chen et al. ............................. 558/44 |
| 4,774,265 | 9/1988 | Ugelstad et al. ...................... 521/55 |
| 4,871,854 | 10/1989 | Oberth et al. ........................... 546/7 |
| 4,963,616 | 10/1990 | Jenekhe ............................... 524/600 |
| 5,011,739 | 4/1991 | Nielsen et al. ................... 428/425.8 |

88:192130d, Wirth, Hermann O. et al., Complexed Compounds.

Sharma, A. K., et al, "Electron Conduction in Fe--Doped Polystyrene Films" Polymer International vol. 25 (1991) pp. 167–172.

Sharma, A. K., et al, "Electron Transport in Fe-Doped Polyvinyl Acetate Films", British Polymer Journal vol. 22 (1990) pp. 39–45.

Britain, J. W., et al, "Catalysis of the Isocyanate Hydroxyl Reaction", Journal of Applied Polymer Science, vol. IV, No. 11 (1960) pp. 207–211.

Hayakawa, S., "Absorption Spectra of Molecular Compounds of Diethyl Ether with Several Metalic Chlorides", Bulletin of the Chemical Society of Japan, vol. 28, No. 6 (1955), pp. 447–448.

MOISTURE STABLE POLYURETHANE BIASABLE TRANSFER MEMBERS

FIELD OF THE INVENTION

This invention relates generally to the field of electrostatography. More particularly, the invention relates to electrically biasable transfer members for use in electrostatographic transfer processes for transferring toner images from one support surface to another and to methods for their preparation.

BACKGROUND

In electrostatography, an image comprising an electrostatic field pattern, usually of non-uniform strength, (also referred to as an electrostatic latent image) is formed on an insulative surface of an electrostatographic element by any of various methods. For example, the electrostatic latent image may be formed electrophotographically (i.e., by imagewise photo-induced dissipation of the strength of portions of an electrostatic field of uniform strength previously formed on a surface of an electrophotographic element comprising a photoconductive layer and an electrically conductive substrate), or it may be formed by dielectric recording (i.e., by direct electrical formation of an electrostatic field pattern on a surface of a dielectric material). Typically, the electrostatic latent image is then developed into a toner image by contacting the latent image with charged toner particles. If desired, the toner image can then be transferred to a final support material or receiver such as a web or sheet of paper and affixed thereto to form a permanent record of the original.

Historically, the transfer of toner images between supporting surfaces has been accomplished with the electrostatic transfer of either a corotron or a roller or belt electrode biased to a certain potential, such electrode being referred to as a bias transfer member (roll or belt). In corona-induced transfer as, for example, disclosed by Vandenberg in U.S. Pat. No. 2,836,725, the final support sheet is placed in direct contact with the toner image while the image is supported on the photoconductive surface. The back of the sheet, that is, the side away from the image, is sprayed with a corona discharge having a polarity opposite to that carried by the toner particle causing the toner to be electrostatically transferred to the sheet. The corotron system is relatively simple. The charges deposited electrostatically tack the final support material, such as paper, to the original toner support, such as, the photoconductor, in addition to creating the desired electric field affecting transfer of the toner to the paper. However, the strong attraction between the paper and the original toner support makes it mechanically difficult to separate the two supports.

Transfer of developed images from the photoconductor to the final support material with the aid of a biased transfer member, such as a biased transfer roll, as a means of controlling the forces acting on the toner during transfer and of avoiding the severe tacking problems encountered with the use of the corona induction system have been tried with limited success. A bias transfer member is a member for electrically cooperating with a conductive support surface to attract electrically charged particles from the support surface towards the member. Bias transfer members are well known in the art. A bias transfer roll is disclosed by Fitch in U.S. Pat. No. 2,807,233, where a metal roll coated with a resilient coating having a resistivity of at least $10^6$ ohm cm is used as a bias transfer member. Because of the resistivity of the coating, the amount of bias that can be applied to the roll is limited to relatively low operating values because, at the higher ranges, the air in or about the transfer zone begins to break down, i.e., ionizes causing the image to be degraded during transfer. Shelffo, in U.S. Pat. No. 3,520,604, discloses a transfer roll made of a conductive rubber having a resistivity in the range of $10^{16}$ to $10^{11}$ ohm cm. Here, in order to give the roll the needed resiliency required in most practical applications, the coating must be relatively thick. A thick coating of high resistivity acts to build up a surface charge on the roll resulting in air break down in the transfer region and eventually copy degradation.

More recently, improved bias transfer members have been disclosed which reportedly have overcome many of the electrical and image degradation problems associated with some of the previous transfer techniques. Dolcimascolo et al, in U.S. Pat. No. 3,702,482, disclose a multiple layer transfer roll member for transferring xerographic images under controlled conditions. The member is capable of electrically cooperating with a conductive support surface to attract charged toner particles from the support surface towards the member or towards a transfer material such as paper positioned therebetween, the member having a conductive substrate for supporting a biased potential thereon, an intermediate blanket (primary layer) placed in contact with the substrate to the outer periphery of the blanket and a relatively thin outer coating (secondary layer) placed over the blanket layer having an electrical resistivity to minimize ionization of the atmosphere when the transfer member is placed in electrical cooperation with the image support surface and providing a good toner release property enabling the device to be cleaned of the toner. Meagher, in U.S. Pat. No. 3,781,105, discloses a similar transfer member employed in conjunction with a variable electrical bias means for regulating automatically the electrical field levels at various points on the transfer member during the transfer operation and providing constant current control.

In the preferred embodiment, the transfer members disclosed in U.S. Pat. No. 3,702,482 and U.S. Pat. No. 3,781,105, consist of a roller having a central biasable conductive core further having an intermediate blanket or electrically "relaxable" layer (primary layer) surrounding and in electrical contact with the core, and further having a second blanket or electrically "self-leveling" outer layer (secondary layer) surrounding and in electrical contact with the primary layer. Under operating conditions, it is desirable for optimal image transfer to maintain a relatively constant current flow of less than about 30 micro amps in the nip area between the transfer roll surface, transfer material, and photoconductive surface from which a developed image is to be transferred. For this condition to exist at given potentials, the resistivity of the primary and secondary layers must be within critical values and preferably be relatively constant under normally anticipated extremes of operating conditions. Preferably, it has been found that the primary layer should be a resilient elastomeric material having a volume resistivity within the range of $10^7$ to less than $10^{11}$ ohm cm, and the secondary layer should also be a resilient material having a volume resistivity within the range of $10^{11}$ to $10^{15}$ ohm cm.

In practice, it has been found that the elastomeric polyurethane materials which are used in the transfer member, and which exhibit resistivities within the above ranges, or the resistivities of which can be adjusted or controlled to within the above ranges, are moisture sensitive such that the resistivity may vary by as much a factor of 50 between 10% and 80% relative humidity as a function of the amount of moisture absorbed from or lost to the surrounding atmosphere. For example, in the case of the polyurethane materials which are employed as the primary layer and which have exceptionally good electrical characteristics, the volume resistivity may change from $10^{11}$ ohm cm at low moisture contents, i.e., less than about 0.1% moisture, to $10^9$ ohm cm at higher moisture levels, i.e., about 2.5% moisture. Other polyurethanes suitable for use as the secondary layer exhibit resistivity variations from about $10^{15}$ to $10^{13}$ ohm cm as a function of increasing moisture content. The consequent variations in resistivity due to relative humidity effects will ordinarily give rise to erratic performance of the transfer member from day to day particularly in terms of transfer efficiency, i.e., the quality of the image transferred unless compensated for by a concomitant change in the voltages sufficient to maintain a constant nip current, as disclosed by Meagher, in U.S. Pat. No. 3,781,105.

Several attempts have been made in the past to control both the resistivity of such materials to within the critical ranges necessary for optimal image transfer and, at the same time, to reduce the moisture sensitivity of such materials to changes in relative humidity so that the resistivity of the materials remains relatively constant within the ranges required for optimal image transfer. For example, Seanor et al, in U.S. Pat. No. 3,959,574, disclose that the resistivity of the elastomeric materials which constitute the primary layers of the multiple layer transfer roll members of Dolcimascolo et al, can be controlled to within the preferred resistivity range of about $10^7$ to about $10^{11}$ ohm cm and can be rendered less sensitive to changes in relative humidity by the addition of certain ionic compounds or agents to the elastomeric materials. Particularly preferred additives disclosed by Seanor et al are quaternary ammonium compounds, including tetraheptylammonium bromide, trimethyloctadecylammonium chloride, and benzyltrimethylammonium chloride. The additive compounds or agents of Seanor et al are worked into the polyurethane by direct melting of the additive into the polyurethane or by incorporating a solution or dispersion of the additive into the polyurethane. As a result of these methods of incorporation, the additive agents of Seanor et al are not anchored in the elastomeric composition and are leached out of the elastomer over time during normal operating conditions which results in a decline in the level of conductivity in the polyurethane elastomers.

Chen et al, in U.S. Pat. No. 4,729,925, and U.S. Pat. No. 4,742,941 disclose, as coating materials for biasable transfer members, polyurethane elastomers made from certain polyisocyanate prepolymers and polyols in which the resistivity can be maintained between $1.0 \times 10^9$ and $1.0 \times 10^{11}$ ohm cm by copolymerizing with the polyisocyanate prepolymers and polyol hardening compounds used to make the polyurethane elastomers certain polyol charge-control agents formed from certain metal salts complexed with particular polyether diols such as, for example, bis[oxydiethylenebis(polycaprolactone)yl]5-sulfo-1,3-benzenedicarboxylate, methyltriphenylphosphonium salt. Unlike the additive control agents of Seanor et al, the polyol charge-control agents of Chen et al are not prone to being leached out of the elastomer during normal usage since they constitute an integral part of the cured polyurethane elastomer into which they are incorporated by virtue of having been copolymerized with the polyisocyanate prepolymers and polyol components used to make the polyurethane during the preparation of the elastomer. The polyurethane elastomers of Chen et al, however, are moisture sensitive. Reference to curve 2 in FIG. 2 of U.S. Pat. No. 4,729,925, indicates, for example, that the volume resistivity of the conductive polyurethane elastomer of Example 15 prepared from a commercial polyurethane mix and the polyol control agent of Example 10 therein, i.e., bis[oxydiethylenebis-(polycaprolactone)yl]-5-sulfo-1,3-benzenedicarboxylate, methyltriphenylphosphonium salt, decreased by a factor of about 6.5 when the relative humidity changed from to about 85%.

In U.S. Pat. No. 5,011,739, issued Apr. 30, 1991, entitled "Moisture Stable Biasable Members and Method for Making Same", to Nielsen et al, there is disclosed, as coating materials for biasable transfer members, certain crosslinked polyurethane elastomers which are not subject to these problems. The coating compositions disclosed in the above-mentioned U.S. Pat. No. 5,011,739, are formed by reacting:

(a) a polyisocyanate prepolymer comprising the reaction product of:
  (i) polyisocyanate, and
  (ii) a polyether polyol selected from the group consisting of a polyalkylene glycol having 2 to 3 carbon atoms in the alkylene group; and
(b) a hardening mixture comprising:
  (i) a polyether polyol selected from the group consisting of a polyalkylene glycol having 2 to 3 carbon atoms in the alkylene group and,
  (ii) as a conductivity-control agent for controlling the resistivity of the elastomeric polyurethane, from 0.01 to 3.0 weight percent based on the total weight of (b) of a complex of an oligoethylene glycol selected from the group consisting of di-, tri- and tetraethylene glycol with an ionizable alkali metal salt selected from the group consisting of sodium iodide, lithium iodide and sodium thiocyanate.

The conductivity control agent containing crosslinked polyurethane elastomers described, when used as coating materials for biasable transfer members, provide biasable transfer members capable of electrically cooperating with a conductive support surface to attract charged toner particles towards the member or towards a transfer material such as a sheet of paper positioned between the member and the conductive support in which the volume resistivity not only can be controlled or adjusted to within a specific range necessary for optimal image transfer, (i.e., from about $10^7$ to about $5.0 \times 10^{10}$ ohm cm), but also one in which the resistivity is substantially insensitive to widely varying changes in relative humidity encountered during normal operating conditions such that the resistivity remains relatively constant within the range required for optimal image transfer. Further, since the conductivity control agents utilized by Nielsen et al are covalently bonded to the backbone and/or the crosslinking portion of the polyurethane elastomer during formation or preparation of the elastomer, there also is provided a coating material for use in a biasable transfer member in which the conductivity control agents used therein are not prone or subject to being leached out of the elastomer over time during normal operating conditions thereby causing a decline in the level of conductivity in the polyurethane elastomer.

While the biasable transfer members disclosed and described in aforementioned U.S. Pat. No. 5,011,739 constitute a significant advancement in the art by providing biasable transfer members in which the resistivity not only can be controlled or adjusted to within a specific range necessary for optimal image transfer, but also one in which the resistivity is substantially insensitive to widely varying changes in relative humidity encountered during normal operating conditions such that the resistivity remains relatively constant within the range required for optimal image transfer, it is desired that even further improvements in this regard be made, particularly with respect to further reducing the sensitivity of the volume resistivity of biasable transfer members to changes in relative humidity. The present invention provides such a biasable transfer member and a method of making same.

SUMMARY OF THE INVENTION

The present invention provides a biasable transfer member, that is, a member capable of electrically cooperating with a conductive support surface to attract charged toner particles from the support surface towards the member. The biasable transfer member comprises a conductive substrate capable of supporting a uniform bias potential thereon and at least one coating comprising a resilient elastomeric polyurethane formed by reacting:

(a) a polyisocyanate prepolymer comprising the reaction product of:
  (i) a saturated aliphatic polyisocyanate, a saturated cycloaliphatic polyisocyanate or an aromatic polyisocyanate; and
  (ii) a polyol free of aliphatic unsaturation; and
(b) a hardening mixture comprising:
  (i) a polyol of (a) (ii) or a diamine free of aliphatic unsaturation, or a mixture thereof; and,
  (ii) as a conductivity-control agent for controlling the resistivity of the elastomeric polyurethane, from 0.001 to 5.0 weight percent, based on the total weight of (b), of a complex of ethylene glycol or an oligoethylene glycol selected from the group consisting of di-, tri- and tetraethylene glycol with an ionizable ferric halide salt selected from the group consisting of ferric fluoride, ferric chloride and ferric bromide, the coating being in electrical contact with the conductive substrate and having an electrical resistivity such that the coating is capable of transmitting a bias potential from the substrate to the outer periphery of the coating.

Since the conductivity agent disclosed and described herein functions to control or alter the resistivity of the elastomeric polyurethane into which it is incorporated, the invention also provides, in another embodiment, a method of controlling the resistivity of a member for electrically cooperating with a conductive support surface, such as a photoconductive surface, to attract charged toner particles from the surface towards the member, which method comprises coating a conductive substrate capable of supporting a uniform bias potential thereon with at least one coating of a resilient elastomeric polyurethane, said coating being in electrical contact with the conductive substrate and formed by reacting:

(a) a polyisocyanate prepolymer comprising the reaction product of:
  (i) a saturated aliphatic polyisocyanate, a saturated cycloaliphatic polyisocyanate or an aromatic polyisocyanate; and
  (ii) a polyol free of aliphatic unsaturation: and
(b) a hardening mixture comprising:
  (i) a polyol of (a) (ii) or a diamine free of aliphatic unsaturation, or a mixture thereof; and,
  (ii) as a conductivity control agent to alter the resistivity of the elastomeric polyurethane, from 0.001 to 5.0 weight percent, based on the total weight of (b), of a complex of ethylene glycol or an oligoethylene glycol selected from the group consisting of di-, tri- and tetraethylene glycol with an ionizable ferric halide salt selected from the group consisting of ferric fluoride, ferric chloride and ferric bromide, whereby the elastomeric polyurethane having an altered resistivity is capable of transmitting a bias potential from the substrate to the outer periphery thereof.

By the use of the term "bias transfer member" or "bias transfer roll", is meant a member or roll for electrically cooperating with a conductive support surface to attract electrically charged particles from the support surface towards the member. In particular, a bias transfer roll is one which electrically cooperates with a photoconductive surface or support, such as a photoconductive plate or photoconductor, when brought into contact therewith, to attract charged toner particles from the plate in the direction of the roll. In this manner, the developed images are transferred from the photoconductor to a final support material, such as paper or the like.

Important advantages of the polyurethane coatings of the biasable transfer members of the invention are that they possess the capability to retain pre-established levels of resistivity and exhibit enhanced moisture insensitivity.

DESCRIPTION OF THE PREFERRED EMBODIMENTS

Figure 1:
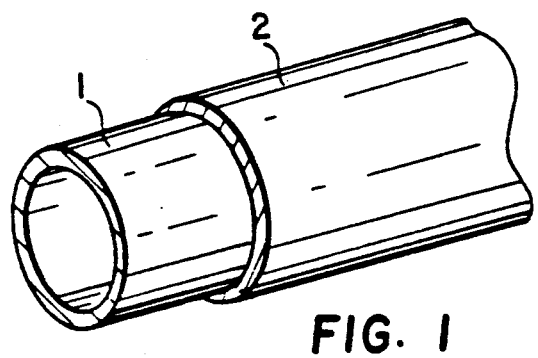
FIG. 1 is a perspective view in partial section showing the construction of a biasable transfer roll of the present invention.

The biasable transfer members of the present invention have application in any suitable electrostatographic device such as, for example, an electrophotographic device, in which a transfer member, more particularly, a bias transfer roll, is used for electrically cooperating with a photoconductive element, plate or surface when brought into contact therewith to attract toner particles bearing an electrostatic charge on the element or plate toward the roll. Transfer is accomplished, as in the prior art, by feeding a sheet of transfer material into the nip region formed by the surface of the transfer roll and the surface of a photoconductive insulating material or element bearing a developed image and imposing a potential on the transfer roll sufficient to cause the transfer of the toner particles or material from the surface of the photoconductive insulating material or element to the adjacent surface of the transfer material. In practice, any source of electrical power connected to the central conductive core of the transfer roll and capable of placing the transfer roll member at a potential sufficient to attract toner images from the photoconductive insulating surface toward the roll may be employed. A more complete discussion of the principles and configurations involved in bias roll transfer may be found in U.S. Pat. Nos. 2,951,443; 3,620,616; 3,633,543; 3,781,105; or 3,708,482.

Referring specifically to FIG. 1, there is shown a cut-away view of a transfer member illustrating the internal construction thereof. The transfer member is in the form of a roll and is basically formed upon a rigid hollow cylinder 1 that is fabricated of a conductive metal, such as aluminum, copper or the like, capable of readily responding to a biasing potential placed thereon. Over core 1 is placed a coating 2 which is a crosslinked or non-crosslinked elastomeric polyurethane containing a conductivity control agent capable of altering or controlling the resistivity of the polyurethane to within a preferred resistivity range consistent with optimal image transfer and which is bonded covalently to the elastomeric network or matrix of the polyurethane, i.e., to the backbone, crosslinking or branched portion of the polyurethane elastomer.

Outer coating 2 which is formed of the resilient elastomeric material can be designed to have a hardness of between about 10 Shore A to about 80 Shore D, and preferably about 15–100 Shore A and may be about 0.125 inch (0.318 cm) to about 0.625 inch (1.58 cm) in thickness, preferably about 0.30 inch (0.762 cm) in thickness, having sufficient resiliency to allow the roll to deform when brought into moving contact with a photoconductive drum surface to provide an extended contact region in which the toner particles can be transferred between the contacting bodies. The elastomeric polyurethane coating should be capable of responding rapidly to the biasing potential to impart electrically the charge potential on the core to the outer extremities of the roll surface. It is preferred that the polyurethane coating have a resistivity of from about $1.0 \times 10^7$ to about $5.0 \times 10^{10}$ ohm cm, and, more preferably, from about $2.0 \times 10^8$ to about $2.0 \times 10^{10}$ ohm cm, as this has been found to be most consistent with optimal image transfer. This is achieved by including in the crosslinked or noncrosslinked polymeric network of the polyurethane elastomer, the conductivity control agent of the present invention. Because the conductivity control agent is bonded covalently to the elastomeric matrix or network of the polymer, it forms a permanently fixed or integral part of the polymer and will not migrate therefrom in contrast to those prior art conductivity control additives which are worked into the polyurethane by direct melting of the additive into the polyurethane or by incorporating a solution or dispersion of the additive into the polyurethane. As a result, a permanent, or at the very least, a relatively constant degree of resistivity is imparted to the polyurethane elastomer that will not change substantially over time during the course of normal operations. In accordance with the present invention, the coating of the conductive substrate must be formulated of at least one layer of an elastomeric polyurethane having covalently bonded to the crosslinked or non-crosslinked polymeric network thereof, a conductivity control agent capable of altering and/or controlling the resistivity of the elastomer to within the preferred or desired resistivity range. By coating the biasable transfer member with these particular polyurethane elastomers, the resistivity of the biasable transfer member is controlled and, in addition, the sensitivity of the resistivity of the biasable transfer member also is controlled in relationship to changes in relative humidity. Thus, the resistivity of the elastomeric polyurethanes having conductivity control agents to control the resistivity of the polyurethanes used as the outer coating of the bias transfer member of FIG. 1 is less sensitive to changes in relative humidity than elastomeric polyurethanes which are not treated with such agents. Examples of the elastomeric crosslinked or non-crosslinked polyurethane materials having conductivity control agents included in the crosslinked or non-crosslinked polymeric networks thereof as an integral part of the polyurethane material in the manner described in accordance with the invention to control the resistivity of the elastomer and hence the biasable transfer member are set forth below.

The polyurethane elastomers which can be used in accordance with the present invention are known polyurethane elastomers which are made from known starting materials using methods which are well known in the art for making polyurethane elastomers plus the conductivity control agents described herein. The conductivity control agents contain an ionic metal salt to impart conductivity to the elastomers.

The polyurethane elastomers are the chemical reaction products of (a) polyisocyanate prepolymers formed from an isocyanate (specifically a saturated aliphatic polyisocyanate, a saturated cycloaliphatic polyisocyanate compound, or an aromatic polyisocyanate compound) reacted with a polyol free of aliphatic unsaturation, and (b), a hardener composition comprising a polyol, as previously described, or a diamine free of aliphatic unsaturation, or a mixture thereof and an amount of the conductivity control agent described hereinbefore sufficient to control the resistivity of the polyurethane elastomer to within a range of from about $1.0 \times 10^7$ to about $5.0 \times 10^{10}$ ohm cm, and more preferably, from about $2.0 \times 10^8$ to about $2.0 \times 10^{10}$ ohm cm. The polyurethane elastomers can be crosslinked or non-crosslinked. If a crosslinked polyurethane is desired, such an elastomer can be readily formed by using an excess of polyisocyanate compound in preparing the elastomer or by utilizing a polyisocyanate, a polyol and/or a polyamine having a functionality greater than two in preparing the elastomer.

The polyisocyanate prepolymer can comprise recurring units derived from any suitable polyol with the proviso that the polyol is free of aliphatic unsaturation, including for example, amine-based polyols, polyether polyols, polyester polyols, mixtures thereof, and aromatic as well as saturated aliphatic and saturated cycloaliphatic polyisocyanates provided they do not adversely affect or in any way interfere with the relative humidity sensitivity or with the resistivity of the polyurethane in general. Exemplary polyisocyanate compounds which may be used to make the prepolymer are exemplified by those disclosed in U.S. Pat. Nos. 2,969,386 and 4,476,292, such as 4,4'-diphenylmethane diisocyanate; 1,5-naphthalene diisocyanate; 3-isocyanatomethyl 3,5,5-trimethylcyclohexyl isocyanate (isophorone diisocyanate); methylenebis(4-isocyanatocyclohexane); hexamethylene diisocyanate; 1,3-cyclohexane bis(methylisocyanate); 2,2,4-trimethylhexamethylene diisocyanate, and combinations thereof, as well as related saturated aliphatic and cycloaliphatic polyisocyanates which may be substituted with other organic or inorganic groups that do not adversely affect the course of the polymerization reaction or interfere with the relative humidity sensitivity or with the resistivity of the polyurethane in general. One preferred polyisocyanate is methylenebis(4-isocyanatocyclohexane). Another preferred polyisocyanate is toluene diisocyanate.

The term "aliphatic", as used herein, includes those carbon chains which are substantially non-aromatic in nature. They must be saturated, however, they may be unbranched, branched or cyclic in configuration and may contain various substituents. Exemplary of long chain aliphatic polyisocyanates are dodedane diisocyanate, tridecane diisocyanate, and the like.

The term "aromatic" as used herein, includes a diatropic moiety derived from benzene, naphthalene, anthracene, phenanthrene, biphenyl and the like. They may be unsubstituted or substituted, for example, with halo, nitro, saturated alkyl, saturated alkoxy, saturated alkylthio or aryl substituents. Included in this definition are also alkylene diaryl structures, for example, diphenylmethane and 1,2-diphenylethane. Exemplary of aromatic diisocyanates are toluene-2,4-diisocyanate, m-phenylene diisocynate, methylene-di-p-phenyl diisocyanate, and the like.

Polyols useful in preparing the polyisocyanate prepolymer and finished polyurethane elastomers are, as previously described, any suitable polyol free of aliphatic unsaturation which will not interfere with the relative humidity sensitivity or with the resistivity of the polyurethane composition or otherwise adversely affect the properties and/or the performance of the polyurethane elastomer in effecting optimal image transfer of the biasable member on which the polyurethane is coated and can include, for example, amine-based polyols, polyether polyols, polyester polyols and mixtures thereof. Examples of such polyols are disclosed in U.S. Pat. Nos. 2,969,386; 3,455,855; 4,476,292 and 4,390,679. One preferred group of polyols are aliphatic polyols and glycols such as glycerol, trimethylolpropane, 1,3-butylene glycol, 1,4-butylene glycol, propylene glycol, hydroxylated castor oils, polyethers such as poly(tetramethylene ether glycols) and poly(propylene ether glycols), low molecular weight polyester polyols, such as polyethylene adipate, and a poly(caprolactone)diol.

A particularly useful polyol which can be used to prepare the polyisocyanate prepolymer and/or chain extend the prepolymer to the final conductive bulk polyurethane is an aliphatic alkylene glycol polymer having an alkylene unit composed of at least two carbon atoms, preferably 2 to 8 carbon atoms. These aliphatic alkylene glycol polymers are exemplified by poly(oxyethylene glycol), poly(oxypropylene glycol) and poly(tetramethylene ether glycol). Di-, tri-, and tetrafunctional compounds are available with the trifunctional ones being exemplified by the reaction product of glycerol or trimethylolpropane and propylene oxide. A typical polyether polyol is available from Union Carbide under the designation PPG-425.

Another preferred group of polyols are amine-based polyols. A wide variety of aromatic and aliphatic diamines may form part of the amine-based polyols. Such polyols include N,N,N'N'-tetrakis(2-hydroxypropyl)ethylenediamine and a polymer of ethylene diamine, propylene oxide and ethylene oxide. A typical aromatic amine-based polyol is available from Upjohn under the designation ISO-NOL 100; a typical aliphatic amine-based polyol is available from BASF under the designation QUADROL and a typical ethylene diamine/propylene oxide/ethylene oxide polymer is available from BASF under the designation PLURACOL 355.

In general, suitable polyols useful for preparing the prepolymer and/or chain extending the prepolymer to the final conductive bulk polyurethane will have molecular weights of from about 60 to 10,000, typically, from about 500 to 3000.

Preferred concentration ranges for the respective components of the prepolymer are 5–40% by weight of polyisocyanate and 60–95% by weight polyol, based on the total weight of the prepolymer, to form a resin prepolymer.

The final conductive bulk polyurethane elastomer is produced by chain-extending and/or crosslinking the prepolymer with a hardener composition comprising at least one additional polyol or blends of polyols of the type aforedescribed and discussed hereinabove and the conductivity control agents described hereinbefore.

The polyol hardener system comprises at least one polyol of the type aforedescribed, such as, for example, an amine-based polyol or a polyether polyol previously identified and defined hereinabove or blends of these polyols.

A preferred polyol is poly(tetramethylene ether glycol) having added thereto about 0.001 to about 5.0 weight percent of the total polyol hardener system of the ionic polyol conductivity control agent as described hereinbefore.

Alternatively, in lieu of, or in addition to, utilizing a polyol of the type and kind described hereinabove in the hardener compositions used to form the presently described polyurethane elastomers, an aliphatic or cycloaliphatic diamine free of aliphatic unsaturation or an aromatic diamine free of aliphatic unsaturation can be used in the hardener composition provided they do not interfere with the relative humidity sensitivity or with the resistivity of the polyurethane elastomer composition or otherwise adversely affect the properties and/or the performance of the polyurethane elastomer in effecting optimal image transfer of the biasable member on which the polyurethane is coated along with the conductivity control agent described hereinbefore. Exemplary diamines which can be used in the hardener compositions of the present invention include 4,4'-methylenebis(o-chloroaniline), phenylenediamine, bis(-4aminocyclohexyl)methane, isophoronyldiamine, and the reaction products of anhydrides with such amines as described in U.S. Pat. No. 4,390,679. Preferred such diamines are 4,4'-methylenebis(o-chloroaniline), diethyltoluenediamine available commercially from Ethyl Corporation, 451 Florida Blvd., Baton Rouge, La. under the trade name Ethacure 100 and di(methylthio)2,4-toluenediamine, also available commercially from Ethyl Corporation under the trade-name Ethacure 300.

Such diamines serve to chain extend the prepolymer to the final conductive bulk polyurethane. Suitable such diamines will typically have molecular weights ranging from about 60 to about 500, and are employed in the hardener compositions alone having added thereto from about 0.001 to about 5.0 weight percent of the total polymer of the conductivity control agent described hereinabove or as a blend in combination with one or more of the aforedescribed polyol components in weight ratios of polyamine to polyol ranging from 1:1 to 1:10 having added thereto from about 0.001 to about 5.0 weight percent of the total polymer of the conductivity control agent aforedescribed.

The polyurethanes are prepared by admixing the prepolymer with the polyol hardener. Catalysts and optional additives also can be included within the hardener or the prepolymer with the provision that they do not interfere with the relative humidity sensitivity or with the volume resistivity of the polyurethane.

In general, if the hardener contains stoichiometric equivalents less than that contained in the prepolymer, a crosslinked polyurethane elastomer will result. On the other hand, if the hardener contains stoichiometric equivalents greater than or equivalent to that contained in the prepolymer, then a non-crosslinked polyurethane elastomer will result. This only applies, however, if all the components in the prepolymer and the hardener are difunctional. If any component, either in the hardener composition or in the prepolymer composition has a functionality greater than two, then the resultant polyurethane elastomer will always be crosslinked.

Further, and if desired, instead of preparing the polyurethane elastomers of the present invention by first forming a polyisocyanate prepolymer and hardening mixture and then reacting the two together, all of the starting materials required to form the polyurethane elastomers of the present invention may simply be added together, reacted and cured in a "one-shot" method of preparation. Or, still further, the conductivity control agent described hereinabove may be added to the polyisocyanate prepolymer instead of the hardener and the prepolymer containing the conductivity control agent and the hardener reacted together to form the polyurethane elastomers of the present invention. If either of these two methods of preparation are used, amounts of conductivity control agent in the range of from about 0.001 to about 5.0 weight percent, based on the total weight of the resultant polyurethane, generally will be appropriate for adjusting the resistivity of the polymer elastomer to within the desired limits.

Catalysts known to those skilled in the art which may be included in the hardener composition may comprise, for example, heavy metals utilized in amounts of about 0.001 to 0.5 % metal, by weight, preferably about 0.1% metal, by weight, of hardener, e.g., organotin, organozinc, mercury, cadmium and magnesium compounds. It has been found, however, that if a bismuth-containing catalyst, such as, for example, bismuth neodecanoate is used in preparing the polyurethane elastomers described herein, that the mole ratio of the ferric halide conductivity control agent to the catalyst must be at least 3:1, or higher. Tertiary amines also may be utilized. Examples of some typical catalysts which may be included in the hardener composition include cadmium 2-ethylhexanoate, cerium 2-ethylhexanoate, chromium 2-ethylhexanoate, cobalt 2-ethylhexanoate, cobalt neodecanoate, copper acetylacetonate, iron stearate, magnesium oleate, manganese 2-ethylhexanoate, molybdenum 2-ethylhexanoate, nickel acetylacetonate, nickel 2-ethylhexanoate, zinc 2-ethylhexanoate, zirconium 2-ethylhexanoate, dibutyltin dilaurate, bismuth neodeconate, bismuth 2-ethylhexanoate, and the like.

Optional additives or addenda which may be included in the hardener composition may comprise, for example, anti-foaming agents such as glycerine, and ethyl acrylate-2-ethylhexyl acrylate copolymer, dimethyl siloxane copolymers and other silicones such as SAG-47 commercially available from Union Carbide Company; antioxidants, such as esters of $\beta$-(3,3-di-tert-butyl-4-hydroxyphenyl)propionic acid with monohydric or polyhydric alcohols, for example, methanol, octadecanol, 1,6-hexanediol, neopentyl glycol, thiodiethylene glycol, diethylene glycol, triethylene glycol, pentaerythritol, tris(hydroxyethyl)isocyanurate, and di(hydroxyethyl)oxalic acid diamide; UV absorbers and light stabilizers such as 2-(2'-hydroxyphenyl)benzyltriazoles and sterically hindered amines such as bis(2,2,6,6-tetramethylpiperidyl)sebacate, bis(1,2,2,6,6-pentamethylpiperidyl)sebacate, n-butyl-3,5-di-tert-butyl-4-hydroxybenzyl malonic acid bis(1,2,2,6,6-pentamethylpiperidyl)ester condensation product of 1-hydroxyethyl-2,2,6,6-tetramethyl-4-hydroxypiperidine and succinic acid, condensation product of N,N'-bis(2,2,6,6-tetramethylpiperidyl)hexamethylenediamine, and 4-tert-octylamino-2,6-dichloro-1,3,5-s-triazine, tris(2,2,6,6-tetramethylpiperidyl)nitrolotriacetate, tetrakis(2,2,6,6-tetramethyl-4-piperidyl)-1,2,3,4-butanetetracarbonic acid and 1,1'-(1,2-ethanediyl)-bis-(3,3,5,5-tetramethylpiperazinone); plasticizers such as phthalates, adipates, glutarates, epoxidized vegetable oils, and the like; fungicides, pigments, dyes; reactive dyes; moisture scavengers; and the like.

The prepolymer-hardener mixtures prior to curing, exhibit sufficiently low viscosities to facilitate mixing, pouring and air bubble diffusion, thereby allowing for the formation of bubble free castings in the configuration of a transfer roller or belt.

Two-component polyurethane mixes of the type described above into which the conductivity control agents of the invention can be incorporated are commercially available. Examples of such commercially available polyurethane systems include CONATHANE TU-500 and CONATHANE TU-400 available from Conap, Inc., Olean, N.Y., and a system sold by Winfield Industries, Inc., Buffalo, N.Y., under the trade name Winthane W643.

The degree of conductivity imparted to the polymer will vary depending primarily upon the amount of conductivity control agent included in the combination of starting materials and the inherent properties of the given polymer and crosslinking agent, if employed, (i.e., the degree of conductivity the polymer would have if no conductivity control agent were included). Any amount of the conductivity control agent sufficient to adjust or alter the resistivity of the elastomeric polyurethane material to within the desired limits, i.e., from higher levels of resistivity to a resistivity in the range of from about $1.0 \times 10^7$ to about $5.0 \times 10^{10}$ ohm cm, or within the range itself, may be used in accordance with the present invention. Resistivities in this range have been found to be consistent with optimal image transfer efficiency. In general, as mentioned previously, concentrations in the range of about 0.001 to 5.0 percent by weight, based on the total weight of the elastomeric polyurethane, have been found to be appropriate for adjusting the resistivity of the polymer to within the desired limits.

Higher amounts of the conductivity control agent may be used, however, to control the resistivity of the polyurethane elastomer, the only limitation being the desired resistivity of the elastomeric polyurethane for use as a coating material upon the conductive substrate of the biasable transfer member.

The conductivity control agent is simply included in the desired amount in the combination of starting materials, most typically as a component of the hardener composition and covalently bonds to the polymer matrix, i.e., to the backbone and/or a crosslinking and/or a branched portion of the polymer during the normal process of elastomer preparation as is explained more fully below.

The conductivity control agents of the invention are comprised of ethylene glycol or a low molecular weight oligoethylene glycol, specifically diethylene glycol, triethylene glycol or tetraethylene glycol, complexed with an ionizable ferric halide salt selected from the group consisting of ferric fluoride, ferric chloride and ferric bromide. Such complexes can be prepared by dissolving an ionizable ferric halide, such as ferric chloride, and a low molecular weight oligoethylene glycol, specifically diethylene glycol, triethylene glycol or tetraethylene glycol, in a suitable solvent, such as methanol, for example, and subsequently evaporating the solvent. The resultant material is believed to be comprised of a complex of the ferric halide with the ethylene glycol or the low molecular weight oligoethylene glycol, aforedescribed. In practice, it is advantageous to include an excess of the oligomer in order to reduce the viscosity of the proposed complex. Optionally, the conductivity control agent may be prepared in the absence of solvent.

As mentioned previously, the conductivity control agent bonds covalently to the polymeric matrix or network. This is achieved by reaction of the hydroxyl groups of the conductivity control agent with excess isocyanate present in the prepolymer which form urethane linkages in the backbone and/or crosslinking and/or branched portions of the polymer thereby firmly anchoring the conductivity control agent in the polymeric network. This enables the polymer to retain a relatively constant degree or level of resistivity which will not change substantially (e.g., decrease) over time during use.

In addition, the conductivity control agents used in the present invention for controlling or adjusting the resistivity of the polyurethane elastomers which form the coatings on the conductive substrates of the biasable transfer members of the invention also significantly reduce the sensitivity of the resistivity of the polyurethane to changes in the relative humidity.

By a significant reduction in the sensitivity of the resistivity to changes in relative humidity is meant a reduction of its sensitivity of at least about 80.0 percent. Reductions in relative humidity sensitivity of up to 98 percent have been demonstrated by the method and compositions of the present invention.

The relative humidity sensitivities of the elastomeric polyurethanes used in the invention for making biasable transfer members by coating a conductive substrate for supporting a uniform bias potential thereon with at least one coating of the elastomeric polyurethane have been obtained by measuring the volume resistivity of the polyurethanes at a relative humidity of 0% and a relative humidity of 100%. The ratio of the resistivity of a relative humidity of 0% to the resistivity at a relative humidity of 100% is the relative humidity sensitivity. This relative humidity sensitivity also is referred to as the relative humidity swing. The ratio of the sensitivity at a relative humidity of 0% and a relative humidity of 100%, should be about 1 to 10 to provide a suitable biasable transfer member in accordance with the present invention. Ideally, the ratio should be 1. As mentioned above, in addition to the desirability of having a low relative humidity swing, the elastomeric polyurethanes useful for biasable transfer members must also have a resistivity of from about $1.0 \times 10^7$ to about $5.0 \times 10^{10}$ ohm cm, and preferably from about $2.0 \times 10^8$ to about $2.0 \times 10^{10}$ ohm cm. In the event a particular elastomeric polyurethane has a resistivity higher than the desired resistivity, the resistivity may be adjusted by the inclusion of a suitable amount of conductivity control agent to adjust the resistivity of the particular polymeric material as described previously.

As mentioned previously, the hardness of the elastomeric polyurethanes of the invention is between about 10 Shore A to about 80 Shore D, and preferably about 15-100 Shore A. The control of the hardness is within the purview of those skilled in the art and the hardness can be controlled by such parameters as by varying the type and amount of reactants used and by using various additives such as plasticizers.

In accordance with the invention, there is described the method of controlling the resistivity of a biasable transfer member. There is also described a method of reducing the sensitivity of the resistivity of the elastomeric polyurethanes to changes in relative humidity by coating a conductive substrate for supporting a uniform bias potential thereon with at least one layer of an elastomeric polyurethane having a conductivity control agent included therein characterized by being bonded covalently to the polymeric network or matrix of the elastomer to control resistivity and having a resistivity of from about $1.0 \times 10^7$ to about $5.0 \times 10^{10}$ ohm cm, and preferably from about $2.0 \times 10^8$ to about $2.0 \times 10^{10}$ ohm cm. The coating can be applied to the substrate by any suitable method or technique known in the art including spraying, casting in molds, affixing sheets of the material to the substrate member by suitable mechanical means or by suitable cement, and the like.

The following examples and comparative tests illustrate more clearly the elastomeric polyurethane materials which may be used in preparing the biasable transfer members of the present invention and for controlling the resistivity of the biasable transfer members of the present invention, including controlling the sensitivity of the resistivity to changes in relative humidity although the invention is not to be construed as limited in scope thereby

SAMPLE PREPARATION

Slabs of the particular elastomeric polyurethanes to be tested were cast in a stainless steel mold in sheets to a thickness of 0.25 inch (0.635 cm). Samples of the various cast materials were placed in controlled humidity chambers for a designated number of days. One set of chambers was maintained at a relative humidity of 0% and another set of chambers was maintained at a relative humidity of 100%. A 0% relative humidity environment was obtained by suspending the test samples in a sealed jar containing 1 inch Drierite at 24° C. A 100% relative humidity environment was obtained by suspending the samples over water in a sealed jar at 24° C. The samples were suspended in the chambers in such a way that both sides were available to the atmosphere. In this manner, the samples would have taken up very close to the equilibrium amounts of water within 14 days. After 14 days, the volume resistivity of the samples were measured according to the procedure of ASTM Standard D-257 by placing the samples between two soft electrodes of a known surface area, applying a 1 kilovolt DC bias from a Trek 610C Cor-A-Trol (high voltage supply) to one electrode and measuring the current from the second electrode using a Kiethly 485 Picoammeter. Values are reported in ohm cm.

The resistivities measured at both 0% and 100% relative humidity were recorded. For the designated examples below, the ratio of the resistivity at 0% relative humidity to the resistivity at 100% relative humidity was determined. The resulting ratio was designated as the RH sensitivity or RH swing and is reported as RH sensitivity in Table I below where resistivity at 0% and 100% relative humidities is also designated for the various samples tested.

EXAMPLE 1

This example describes the preparation of a conductivity control agent useful in accordance with the invention which is a diethylene glycol-ferric chloride complex.

A complex of diethylene glycol and ferric chloride was prepared by slowly adding 162.21 g (1.0 mol) of anhydrous ferric chloride to a 2 liter, three-neck round bottom flask equipped with a Teflon blade stirrer and containing 1 liter of dry methanol with 100 ml of dry methanol rinse. The addition process was exothermic and resulted in a dark turbid solution. Next, 318.36 g (3.0 mol) of diethylene glycol were added to the flask with 100 ml of dry methanol rinse. The resultant hazy solution was stirred for approximately 10 minutes and then filtered through diatomaceous earth with more dry methanol wash. The combined clear filtrate and wash were concentrated in vacuo with steam bath heating to give 475.20 g of a dark syrupy complex (99.09% of theory) characterized by combustion and ICP analysis as diethylene glycol complexed with ferric chloride.

Anal. Calcd. for $C_{12}H_{30}Cl_3O_9Fe$: C, 29.99; H, 6.29; Cl, 22,13; Fe, 11.6; Found: C, 29.94; H, 5.93; Cl, 22.49; Fe, 10.9.

EXAMPLE 2

This example describes the preparation of a cross-linked 40 Durometer Shore A hardness elastomeric polyurethane of the invention prepared from a two-component polyurethane commercial mix obtained from Conap Inc., Olean, N.Y., designated as CONATHANE TU-400 containing the conductivity control agent prepared in accordance with Example 1.

A one-liter glass beaker was charged with 0.45 g of the conductivity control agent prepared in accordance with Example 1. To the beaker were added 83.59 g of CONATHANE TU-400 Part B of the mix, a hydroxyl terminated polymer based on poly(propylene oxide) and a phenylene diamine chain extender, and the mixture was mechanically stirred at room temperature until a solution was obtained. Next, 96.41 g of CONAIHANE TU-400 Part A of the mix, i.e., methylene-bis(4-isocyanatocyclohexane) and a hydroxyl-terminated polymer based on poly(propylene oxide) were added to the beaker and the mixture was mechanically stirred for five minutes. The entrapped air was removed under reduced pressure and the mixture was poured into a prepared stainless steel mold which was placed into an 80° C. hot air oven for three hours. The resulting slab was removed from the mold and post cured at 80° C. in a hot air oven for thirteen hours. The slab was then removed from the oven, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. The results are shown in Table I, Example 2 below.

Comparative Example 3

This example describes the preparation of the cross-linked polyurethane elastomer of Example 2 without the conductivity control agent of Example 1, as a control, and the resistivity and relative humidity sensitivity of the elastomer as measured in accordance with the aforedescribed procedure.

A one-liter glass beaker was charged with 83.59 g of CONATHANE TU-400 Part B, as defined in Example 2. Next, a solution of 96.41 g of CONATHANE TU-400 Part A, as defined in Example 2, was added to the beaker and the resultant mixture was mechanically stirred for five minutes at room temperature. The entrapped air was removed under reduced pressure and the mixture was poured into a prepared stainless steel mold which was placed into an 80° C. hot air oven for three hours. The resulting slab was removed from the mold and post cured at 80° C. in a hot air oven for thirteen hours. The slab was then removed from the oven, cooled to room temperature and the resistivities of the resultant slab molded to a thickness of 0.25 inch (0.625 cm) were measured as described above at the two designated relative humidities and the relative humidity sensitivity was determined after an equilibration time of fourteen days in a relative humidity chamber. The results are shown in Table I, Example 3 below.

EXAMPLE 4

This example describes the preparation of a cross-linked 50 Durometer Shore A hardness elastomeric polyurethane of the invention prepared from from a two-component polyurethane commercial mix obtained from Conap Inc., Olean, New York, designated as CONATHANE TU-500 containing the conductivity control agent prepared in accordance with Example 1.

To a one-liter glass beaker containing 78.78 g of CONATHANE TU-500 Part B of the mix, a hydroxyl-terminated polymer based on poly(propylene oxide) and a phenylene diamine chain extender, there was charged 0.5413 g of a ferric chloride-diethylene glycol conductivity control agent prepared in accordance with Example 1. The mixture was stirred at room temperature until homogeneous. Next, 101.70 g of CONATHANE TU-500 Part A of the mix, i.e., methylenebis(4-isocyanatocyclohexane) and a hydroxy-terminated polymer based on poly(propylene oxide) were added to the beaker and the reaction mixture was mechanically stirred at room temperature for five minutes. The entrapped air was removed under reduced pressure and the mixture was poured into a prepared stainless steel mold which was placed into an 80° C. hot air oven for sixteen hours to cure. The resulting slab was then removed from the oven, removed from the mold, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. The results are shown in Table I, Example 4 below.

COMPARATIVE EXAMPLE 5

This example describes the preparation of the cross-linked polyurethane elastomer of Example 4 without the conductivity control agent of Example 1, as a control, and the resistivity and relative humidity sensitivity of the elastomer as measured in accordance with the aforedescribed procedure.

A one-liter glass beaker was charged with 78.78 g of CONATHANE TU-500 Part B, as defined in Example 4. Next, a solution of 101.70 g of CONATHANE TU-500 Part A, as defined in Example 4, was added to the beaker and the resultant mixture was mechanically stirred for five minutes at room temperature. The entrapped air was removed under reduced pressure and the mixture was poured into a prepared stainless steel mold which was placed into an 80° C. hot air oven for sixteen hours to cure. The resulting slab was then removed from the oven, demolded, cooled to room temperature and the resistivities of the resultant slab molded to a thickness of 0.25 inch (0.625 cm) were measured as described above at the two designated relative humidities and the relative humidity sensitivity was determined after an equilibration time of fourteen days in a relative humidity chamber. The results are shown in Table I, Example 5 below.

EXAMPLE 6

This example describes the preparation of a cross-linked 90 Durometer Shore A hardness elastomeric polyurethane of the invention prepared from a two-component polyurethane commercial mix obtained from Conap Inc., Olean, N.Y., designated as CONATHANE TU-900 containing the conductivity control agent prepared in accordance with Example 1.

To a one-liter glass beaker containing 48.57 g of CONATHANE TU-900 Part B of the mix, a hydroxyl-terminated polymer based on poly(propylene oxide) and a phenylene diamine chain extender, there were charged 3.6 g of the ferric chloride-diethylene glycol conductivity control agent prepared in accordance with Example 1. The mixture was stirred at room temperature until homogeneous. Next, 127.5 g of CONATHANE TU-900 Part A of the mix, i.e., methylenebis(4-isocyantocyclohexane) and a hydroxy-terminated polymer based on poly(propylene oxide) were added to the beaker and the reaction mixture was mechanically stirred at room temperature for five minutes. The entrapped air was removed under reduced pressure and the mixture was poured into a prepared stainless steel mold which was placed into an 80° C. hot air oven for sixteen hours to cure. The resulting slab was then removed from the oven, demolded, cooled to room temperature and the resistivities of the resultant slab molded to a thickness of 0.25 inch (0.635 cm) were measured as described above at the two designed relative humidities and the relative humidity sensitivity was determined after an equilibration time of fourteen days in a relative humidity chamber. The results are shown in Table I, Example 6, below.

COMPARATIVE EXAMPLE 7

This example describes the preparation of the cross-linked polyurethane elastomer of Example 6 without the conductivity control agent of Example 1, as a control, and the resistivity and relative humidity sensitivity of the elastomer as measured in accordance with the aforedescribed procedure.

A one-liter glass beaker was charged with 48.57 g of CONATHANE TU-900 Part B, as defined in Example 6. Next, a solution of 127.5 g of CONATHANE TU-900 Part A, as defined in Example 6, was added to the beaker and the resultant mixture was mechanically stirred for five minutes at room temperature. The entrapped air was removed under reduced pressure and the mixture was poured into a prepared stainless steel mold which was placed into an 80° C. hot air oven for sixteen hours. The resulting slab was then removed from the oven, demolded, cooled to room temperature, and the resistivities of the resultant slab molded to a thickness of 0.25 inch (0.625 cm) were measured as described above at the two designated relative humidities and the relative humidity sensitivity was determined after an equilibration time of fourteen days in a relative humidity chamber. The results are shown in Table I, Example 7 below.

EXAMPLE 8

This example describes the preparation of a cross-linked 90 Durometer Shore A hardness elastomeric polyurethane of the invention containing the conductivity control agent of Example 1.

To a one-liter glass beaker containing 171.0 g of a toluene diisocyanate/polytetramethylene ether glycol prepolymer obtained from Uniroyal Co. as Adiprene L100, there were added 9.0 g (0.042 mol) of di(methylthio)-2,4-toluenediamine, an aromatic diamine sold by and obtained from Ethyl Corporation under the trade name Ethacure 300, and 0.45 g of the ferric chloride-diethylene glycol conductivity control agent prepared as described in Example 1. The reaction was stirred at room temperature, under nitrogen, for five minutes, degassed and poured into a heated stainless steel mold. The polymer was cured for sixteen hours at 80° C. and demolded. The slab was then cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. The results are shown in Table I, Example 8 below.

COMPARATIVE EXAMPLE 9

This example describes the preparation of the cross-linked polyurethane elastomer of Example 8 without the conductivity control agent of Example 1, as a control, and the resistivity and relative humidity sensitivity of the elastomer as measured in accordance with the aforedescribed procedure.

To a one-liter glass beaker containing 171.0 g of a toluene diisocyanate/polytetramethylene ether glycol prepolymer obtained from Uniroyal Co. as Adiprene L100, there were added 9.0 g (0.042 mol) of di(methylthio)-2,4-toluenediamine, an aromatic diamine sold by and obtained from Ethyl Corporation as Ethacure 300, as defined in previous Example 8. The reaction was stirred at room temperature, under nitrogen, for five minutes, degassed and poured into a heated stainless steel mold. The polymer was cured for sixteen hours at 80° C. and demolded. The slab was then cooled to room temperature and the resistivities of the resultant slab molded to a thickness of 0.25 inch (0.625 cm) were measured as described above at the two designated relative humidities and the relative . humidity sensitivity was determined after an equilibration time of fourteen days in a relative humidity chamber. The results are shown in Table I, Example 9 below.

EXAMPLE 10

This example describes the preparation of a crosslinked 55 Durometer Shore A hardness elastomeric polyurethane of the invention prepared from a two-component polyurethane commercial mix obtained from Winfield Industries, Inc., Buffalo, N.Y., designated as Winthane W643 containing the conductivity control agent prepared in accordance with Example 1.

To a one-liter glass beaker containing 11.13 g of Winthane W643 Part B of the mix, there was charged 0.63 g of the ferric chloride-diethylene glycol conductivity control agent prepared in accordance with Example 1. The mixture was stirred at room temperature until homogeneous. Next, 169.0 g of Winthane W643 Part A of the mix were added to the beaker and the reaction mixture was mechanically stirred at room temperature for three minutes. The entrapped air was removed under reduced pressure and the mixture was poured into a prepared stainless steel mold which was placed into an 80° C. hot air oven for sixteen hours to cure. The resulting slab was then removed from the oven, demolded, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. The results are shown in Table I, Example 10 below.

COMPARATIVE EXAMPLE 11

This example describes the preparation of the crosslinked polyurethane elastomer of Example 10 without the conductivity control agent of Example 1, as a control, and the resistivity and relative humidity sensitivity of the elastomer as measured in accordance with the aforedescribed procedure.

A one-liter glass beaker was charged with 11.13 g of Winthane W643 Part B. Next, a solution of 169.0 g of Winthane W643 Part A of the mix were added to the beaker and the resultant mixture was mechanically stirred for three minutes at room temperature. The entrapped air was removed under reduced pressure and the mixture was poured into a prepared stainless steel mold which was placed into an 80° C. hot air oven for sixteen hours. The resulting slab was then removed from the oven, demolded, cooled to room temperature and the resistivities of the resultant slab molded to a thickness of 0.25 inch (0.625 cm) were measured as described above at the two designated relative humidities and the relative humidity sensitivity was determined after an equilibration time of fourteen days in a relative humidity chamber. The results are shown in Table I, Example 11 below.

EXAMPLE 12

This example describes the preparation of a crosslinked 48 Durometer Shore A hardness elastomeric polyurethane of the invention containing the conductivity control agent of Example 1.

To a 500 ml resin kettle containing 98.63 g (0.098 mol) of Terathane 1000, a poly(tetramethylene ether glycol) available from E.I. DuPont de Nemours Company, (Mn=1000) and 0.36 g of the ferric chloride-diethylene glycol conductivity control agent prepared in accordance with Example 1, there were added, with stirring, 65.70 g (0.25 mol) of methylenebis(4-isocyanatocyclohexane) obtained commercially from Mobay Corporation under the trade name Desmodur W. The stirred reaction mixture was heated at 80° C. under nitrogen for seventy minutes. Next, 98.63 g (0.098 mol) of poly(tetramethylene ether glycol) were added along with 4.0 g (0.0225 mol) of an isomeric mixture of diethyltoluenedimaine obtained commercially as Ethacure 100 from Ethyl Corporation. The reaction was stirred under nitrogen at 80° C. for five minutes, degassed under reduced pressure and poured into a stainless steel mold. The polymer was cured in an 80° C. oven for sixteen hours. The slab was then removed from the oven, demolded, cooled to room temperature and the resistivities of the resultant slab molded to a thickness of 0.25 inch (0.625 cm) were measured as described above at the two designated relative humidities and the relative humidity sensitivity was determined after an equilibration time of fourteen days in a relative humidity chamber. The results are shown in Table I, Example 12 below.

EXAMPLE 13

This example describes the preparation of a crosslinked 22 Durometer Shore A hardness elastomeric polyurethane of the invention containing the conductivity control agent of Example 1.

To a 500 ml resin kettle containing 195.0 g (0.098 mol) poly(propylene glycol) obtained commercially from Dow Chemicals under the trade name Polyglycol P-2000 ($M_n$=2000) and 65.79 g (0.25 mol) of methylenebis(4-isocyanatocyclohexane), obtained commercially from Mobay Corporation under the trade name Desmodur W, there was added, with stirring, 0.40 g of the ferric chloride-diethylene glycol conductivity control agent prepared in accordance with Example 1. The reaction mixture was stirred at 80° C. under nitrogen for one hour. Next, 195.0 g (0.098 mol) of the poly(propylene glycol) aforedescribed and 4.90 g (0.0275 mol) of an isomeric mixture of diethyltoluenediamine, obtained commercially as Ethacure 100 from Ethyl Corporation, were added to the reaction mixture. The reaction mixture was stirred for five minutes, under nitrogen, degassed under reduced pressure and poured into a stainless steel mold. The polymer was cured in an 80° C. oven for sixteen hours. The slab was then removed from the oven, demolded, cooled to room temperature and the resitivities of the resultant slab molded to a thickness of 0.25 inch (0.635) were measured as described above at the two designated relative humidities and the relative humidity sensitivity was determined after an equilibration time of fourteen days in a relative humidity chamber. The results are shown in Table I, Example 13 below.

EXAMPLE 14

This example describes the preparation of a crosslinked 50 Durometer Shore A hardness elastomeric polyurethane of the invention containing the conductivity control agent of Example 1.

To a 500 ml resin kettle containing 121.89 g (0.098) poly(caprolactone)diol; $M_n$=1250 obtained commercially from Aldrich Chemical Co., Inc., and 65.79 g, (0.25mol) of methylenebis(4-isocyanatocylcohexane), obtained commercially from Mobay Corporation under the trade name Desmodur W, there was added, with stirring, 0.40 g of the ferric chloride-diethylene glycol conductivity control agent prepared in accordance with Example 1. The reaction was stirred, under nitrogen, at 80° C. for seventy minutes. Next. 121.89 g (0.098 mol) of poly(caprolactone)diol and 4.90 g (0.0275 mol) of an isomeric mixture of diethyltoluenediamine, obtained commercially as Ethacure 100 from Ethyl Corporation, were added to the reaction mixture. The reaction mixture was stirred, under nitrogen, for five minutes, degassed under reduced pressure and poured into a stainless steel mold. The polymer was cured in an 80° C. oven for sixteen hours. The slab was then removed from the oven, demolded, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. The results are shown in Table I, Example 14 below.

EXAMPLE 15

This Example describes the preparation of a cross-linked elastomeric polyurethane outside the scope of the invention to show that the polyurethane elastomers of the present invention are superior to polyurethane elastomers of the prior art with respect to moisture stability. The example shows the preparation of a polyurethane elastomer made from the two-part CONATHANE TU-500 commercial polyurethane mix described above except that 0.14 weight percent of the conductivity control agent described in Example 9 of U.S. Pat. No. 5,011,739, i.e., a complex of lithium iodide and tetramethylene glycol was added to Part B of the polyurethane mix prior to the addition of Part B to Part A of the mix.

A one-liter glass beaker was charged with 0.21 of the lithium iodide-tetraethylene glycol conductivity control agent prepared as follows. To a 500 ml single-neck, round-bottom flask equipped with a magnetic stirrer containing 11.24 g (0.084 mol) of lithium iodide and 100 ml of methanol, there was added 16.31 (0.084 mol) of tetraethylene glycol. The solution was stirred for 10 minutes. The methanol was removed under reduced pressure leaving a solid material characterized by combustion analysis as tetraethylene glycol complexed with lithium iodide. The beaker was then placed into a hot air oven and heated at 150° C. until the lithium iodide-tetraethylene glycol conductivity control agent melted. To the beaker were added 65.90 g of CONATHANE TU-500 Part B of the mix, a hydroxy-terminated polymer based on poly(propylene oxide) and a phenylene diamine chain extender, and the mixture was mechanically stirred while heated until a solution was obtained. Next, 83.88 g of CONATHANE TU-500 Part A of the mix, i.e., methylenebis(4-isocyanatocyclohexane) and a hydroxyl-terminated polymer based on poly(propylene oxide) were added to the beaker and the mixture was mechanically stirred for 5 minutes. The entrapped air was removed under reduced pressure and the mixture was poured into a prepared stainless steel mold which was placed into an 80° C. hot air oven for 3 hours. The resulting slab was removed from the mold and post cured at 80° C. in a hot air oven for 13 hours. The slab was then cooled to room temperature and the resistivities were measured as described above at the two designated relative humidities and the relative humidity sensitivity was determined after an equilibration time of 14 days in a relative humidity chamber. The results are shown in Table I, Example 15 below.

TABLE I

Humidity Sensitivities of the Polyurethane Elastomers of Examples 2-15

| Examples | Resistivity at Designated Relative Humidity 0% | 100% | Time (Days) | RH Sensitivity |
|---|---|---|---|---|
| Example 2 | $3.58 \times 10^8$ | $2.73 \times 10^8$ | 14 | 1.31 |
| Comparative Example 3 | $1.16 \times 10^{12}$ | $1.63 \times 10^{10}$ | 14 | 71.17 |
| Example 4 | $8.96 \times 10^8$ | $1.03 \times 10^9$ | 14 | 0.87 |
| Comparative Example 5 | $9.79 \times 10^{11}$ | $4.81 \times 10^{10}$ | 14 | 20.35 |
| Example 6 | $1.60 \times 10^8$ | $9.63 \times 10^7$ | 14 | 1.66 |
| Comparative Example 7 | $7.33 \times 10^{12}$ | $1.23 \times 10^{11}$ | 14 | 59.59 |
| Example 8 | $1.36 \times 10^8$ | $1.19 \times 10^8$ | 14 | 1.14 |
| Comparative Example 9 | $2.27 \times 10^{11}$ | $2.90 \times 10^{10}$ | 14 | 7.83 |
| Example 10 | $5.17 \times 10^8$ | $1.01 \times 10^8$ | 14 | 5.12 |
| Comparative Example 11 | $7.76 \times 10^{11}$ | $1.23 \times 10^{10}$ | 14 | 63.09 |
| Example 12 | $2.62 \times 10^9$ | $2.37 \times 10^9$ | 14 | 1.11 |
| Example 13 | $3.56 \times 10^9$ | $1.58 \times 10^9$ | 14 | 2.25 |
| Example 14 | $2.93 \times 10^9$ | $1.09 \times 10^9$ | 14 | 2.7 |
| Example 15 | $9.73 \times 10^9$ | $7.04 \times 10^9$ | 14 | 1.38 |

The reduction in resistivity by the use of the conductivity control agents of the invention, as well as the resulting reduction in RH sensitivity, is clearly shown in Table I by comparing the resistivities and the RH sensitivities of the polyurethane elastomers of Comparative Examples 3, 5, 7, 9 and 11, without a conductivity control agent of the present invention, to the resistivities and the RH sensitivities of the polyurethane elastomers of Examples 2, 4, 6, 8 and 10, respectively, consisting of the same polyurethane elastomers of Examples 3, 5, 7, 9 and 11, but containing a conductivity control agent of the present invention. Further, a comparison of the relative humidity sensitivity and resistivity of the polyurethane elastomer of Example 15 containing the lithium iodide-tetramethylene glycol conductivity control agent of Example 9 of U.S. Pat. No. 5,011,739, with the relative humidity sensitivity of the polyurethane elastomer of Example 4 consisting of the same polyurethane elastomer but containing a conductivity control agent of the present invention, clearly shows the substantial reduction in RH sensitivity when the conductivity control agent of the present invention is used to control the resistivity of the polyurethane elastomer as compared to the alkali metal salt-oligoethylene glycol complex conductivity control agent of the prior art.

EXAMPLE 16

This example describes the preparation of a linear, non-crosslinked 62 Durometer Shore A hardness thermoplastic polyurethane containing the conductivity control agent prepared in accordance with Example 1.

A mixture of 140.0 g (0.14 mol) of commercially available poly(tetramethylene ether glycol) obtained under the trade name Terathane 1000 from E.I. DuPont de Nemours Company, ($M_n$=1,000) and 0.16 g of dibutyltin dilaurate was dried in a 3-neck, 500 ml round bottom flask equipped with a Teflon blade stirrer at room temperature in vacuo (approximately 1.0 mm) for approximately 30 minutes. Next, 52.47 g (0.20 mol) of methylenebis(4-isocyanatocyclohexane) obtained commercially under the trade name Desmodur W from Mobay Corporation were added to the flask and the reaction mixture was heated in an 80° C. bath under nitrogen for 70 minutes to form the isocyanate terminated prepolymer. An isomeric mixture of 7.84 g (0.044 mol) of diethyltoluenediamine, obtained commercially under the trade name Ethacure 100 from Ethyl Corporation, was then added to the flask along with 2.56 g of the ferric chloride-diethylene glycol conductivity control agent prepared in accordance with the procedure of Example 1. The mixture was stirred for approximately 5 minutes in an 80° C. bath, degassed under reduced pressure and poured into a stainless steel mold. The polymer was cured in an 80° C. oven for 20 hours, demolded, cooled to room temperature and the resistivities of the resultant slab molded to a thickness of 0.25 inch (0.625 cm) were measured as described above at the two designated relative humidities and the relative humidity sensitivity was determined after an equilibration time of fourteen days in a relative humidity chamber. The results are shown in Table II, Example 16 below.

COMPARATIVE EXAMPLE 17

This example describes the preparation of the linear, non-crosslinked polyurethane elastomer of Example 16 without the conductivity control agent of Example 1, as a control, and the resistivity and relative humidity sensitivity of the elastomer as measured in accordance with the aforedescribed procedure.

Commercially available poly(tetramethylene ether glycol), 140.0 g (0.14 mol), obtained under the trade name Terathane 1000 from E.I. DuPont de Nemours Company, ($M_n=1,000$) was dried in a three-neck, 500 ml round bottom flask equipped with a Teflon blade stirrer at room temperature in vacuo (approximately 1.0 mm) for approximately 30 minutes. Next, 52.47 g (0.20 mol) of methylenebis(4-isocyanatocyclohexane), obtained commercially under the trade name Desmodur W from Mobay Corporation, along with 0.16 g of dibutyltin dilaurate were added to the flask and the reaction mixture was heated in an 80° C. bath under nitrogen for seventy minutes to form the isocyanate terminated prepolymer. An isomeric mixture of 7.84 g (0.044 mol) of diethyltoluenediamine obtained commercially under the trade name Ethacure 100 from Ethyl Corporation, was then added to the flask along with 1.70 g (0.016 mol) of diethylene glycol in place of the conductivity control agent of Example 1 to insure that a polyurethane elastomer of the same stoichiometric balance as that produced in Example 16, but devoid of any conductivity control agent of the present invention, was obtained. The mixture was stirred for approximately 5 minutes in an 80° C. bath, degassed under reduced pressure and poured into a stainless steel mold. The polymer was cured in an 80° C. oven for 20 hours, demolded, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relatively humidity chamber. The results are shown in Table II, Example 17 below.

EXAMPLE 18

This example describes the preparation of a linear, non-crosslinked 50 Durometer Shore A hardness thermoplastic polyurethane containing the conductivity control agent prepared in accordance with Example 1.

In a 3-neck, 500 ml round bottom flask equipped with a Teflon blade stirrer, 140.0 g (0.14 mol) of poly(propylene glycol); $M_n=1000$, was dried at room temperature in vacuo (approximately 1.0 mm) for approximately 30 minutes. Next, 52.47 g (0.20 mol) of methylenebis(4-isocyanato-cyclohexane), obtained commercially under the trade name Desmodur W from Mobay Corporation, along with 0.16 g of dibutyltin dilaurate, were added to the flask and the reaction mixture was heated in an 80° C. bath under nitrogen for 70 minutes to from the isocyanate terminated prepolymer. An isomeric mixture of 7.84 g (0.044 mol) of diethyltoluenediamine, obtained commercially under the trade name Ethacure 100 from Ethyl Corporation, was added along with 2.56 g of the ferric chloride-diethylene glycol conductivity control agent prepared in accordance with the procedure of Example 1. The mixture was stirred for approximately 5 minutes in an 80° C. bath, degassed under reduced pressure and poured into a stainless steel mold. The polymer was cured in an 80° C. oven for 16 hours, demolded, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. The results are shown in Table II, Example 18 below.

EXAMPLE 19

This example describes the preparation of a linear, non-crosslinked 80 Durometer Shore A hardness thermoplastic polyurethane containing the conductivity control agent prepared in accordance with Example 1.

In a 3-neck, 500 ml round-bottom flask equipped with a Teflon blade stirrer, 140.0 g (0.215 mol) of commercially available poly(tetramethylene ether glycol), obtained under the trade name Terathane 650 from E. I. DuPont de Nemours Company, ($M_n=650$) was dried at room temperature in vacuo (approximately 1.0 mm) for approximately 30 minutes. Next, 80.725 g (0.308 mol) of methylenebis(4-isocyanatocyclohexane), obtained commercially under the trade name Desmodur W from Mobay Corporation, along with 0.246 g of dibutyltin dilaurate, were added to the flask and the reaction mixture was heated in an 80° C. bath under nitrogen for 70 minutes to form the isocyanate terminated prepolymer. An isomeric mixture of 14.26 g (0.080 mol) of an isomeric mixture of diethyltoluenediamine, obtained commercially under the trade name Ethacure 100 from Ethyl Corporation, was added along with 1.97 g of the ferric chloride-diethylene glycol conductivity control agent prepared in accordance with the procedure of Example 1. The mixture was stirred for approximately 5 minutes in an 80° C. bath, degassed under reduced pressure and poured into a stainless steel mold. The polymer was cured in an 80° C. oven for 16.5 hours, demolded, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. The results are shown in Table II, Example 19 below.

COMPARATIVE EXAMPLE 20

This example describes the preparation of the linear, non-crosslinked polyurethane elastomer of Example 19 without the conductivity control agent of Example 1, as a control, and the resistivity and relative humidity sensitivity of the elastomer as measured in accordance with the aforedescribed procedure.

In a three-neck, 500 ml round-bottom flask equipped with a Teflon blade stirrer, 140.0 g (0.215 mol) of commercially available poly(tetramethylene ether glycol) obtained under the trade name Terathane 650 from E. I. DuPont de Nemours Company ($M_n=650$) was dried at room temperature in vacuo (approximately 1.0 mm) for approximately 30 minutes. Next, 80.725 g (0.308 mol) of methylenebis(4-isocyanatocyclohexane), obtained commercially under the trade name Desmodur W from Mobay Corporation, along with 0.246 g of dibutyltin dilaurate, were added to the flask and the reaction mixture was heated in an 80° C. bath under nitrogen for 70 minutes to form the isocyanate terminated prepolymer. An isomeric mixture of 14.26 g (0.080 mol) of diethyltoluenediamine, obtained commercially under the trade name Ethacure 100 from Ethyl Corporation, was then added to the flask, along with 1.31 g (0.0123 mol) of diethylene glycol in place of the conductivity control agent of Example 1 to insure that a polyurethane elastomer of the same stoichiometric balance as that produced in Example 19, but devoid of any conductivity control agent of the present invention, was obtained. The mixture was stirred for approximately 5 minutes in an 80° C. bath, degassed under reduced pressure and poured into a stainless steel mold. The polymer was cured in an 80° C. oven for 16.5 hours, demolded, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. The results are shown in Table II, Example 20 below.

EXAMPLE 21

This example describes the preparation of a linear, non-crosslinked 88 Durometer Shore A hardness thermoplastic polyurethane containing the conductivity control agent prepared in accordance with Example 1.

In a 3-neck, 500 ml round-bottom flask equipped with a Teflon blade stirrer, 97.50 g (0.15 mol) of commercially available poly(tetramethylene ether glycol) obtained under the trade name Terathane 650 from E. I. DuPont de Nemours Company ($M_n=650$) was dried at room temperature in vacuo (approximately 1.0 mm) for approximately 30 minutes. Next, 65.59 g (0.25 mol) of methylenebis(4-isocyanatocyclohexane), obtained commercially under the trade name Desmodur W from Mobay Corporation, along with 0.20 g dibutyltin dilaurate, were added to the flask and the reaction mixture was heated in an 80° C. bath under nitrogen for 70 minutes to form the isocyanate terminated prepolymer. An isomeric mixture of 16.94 g (0.095 mole) of diethyltoluenediamine, obtained commercially under the trade name Ethacure 100 from Ethyl Corporation, was added along with 0.80 g of the ferric chloride-diethylene glycol conductivity control agent prepared in accordance with the procedure of Example 1. The mixture was stirred for approximately 5 minutes in an 80° C. bath, degassed under reduced pressure and poured into a stainless steel mold. The polymer was cured in an 80° C. oven for 3.3 hours, demolded and post cured in an 80° C. oven for 16.5 hours, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. All results are shown in Table II, Example 21 below.

EXAMPLE 22

This example describes the preparation of a linear, non-crosslinked 49 Durometer Shore A hardness thermoplastic polyurethane containing the conductivity control agent prepared in accordance with Example 1.

In a 3-neck, 500 ml round-bottom flask equipped with a Teflon blade stirrer, 175.0 g (0.14 mol) of poly(caprolactone)diol; ($M_n=1250$) was dried at room temperature in vacuo (approximately 1.0 mm) for approximately 30 minutes. Next, 52.47 g (0.20 mol) of methylenebis(4-isocyanatocyclohexane), obtained commercially under the trade name Desmodur W from Mobay Corporation, along with 0.16 g of dibutyltin dilaurate, were added to the flask and the reaction mixture was heated in an 80° C. bath under nitrogen for 70 minutes to form the isocyanate terminated prepolymer. An isomeric mixture of 7.84 g (0.044 mol) of diethyltoluenediamine, obtained commercially under the trade name Ethacure 100 from Ethyl Corporation, was then added to the flask along with 2.56 g of the ferric chloride-diethylene glycol conductivity control agent prepared in accordance with the procedure of Example 1. The mixture was stirred for approximately 5 minutes in an 80° C. bath, degassed under reduced pressure and poured into a stainless steel mold. The polymer was cured in an 80° C. oven for 16 hours, demolded, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. The results are shown in Table II, Example 22 below.

EXAMPLE 23

This example describes the preparation of a linear, non-crosslinked 78 Durometer Shore A hardness thermoplastic polyurethane containing the conductivity control agent prepared in accordance with Example 1.

In a 3-neck, 1000 ml round-bottom flask equipped with a Teflon blade stirrer, 341.25 g (0.525 mol) of commercially available poly(tetramethylene ether glycol), obtained under the trade name Terathane 650 from E. I. DuPont de Nemours Company ($M_n=650$) was dried at room temperature in vacuo (approximately 1.0 mm) for approximately 30 minutes. Next, 196.76 g (0.75 mol) of methylenebis(4-isocyanatocyclohexane), obtained commercially under the trade name Desmodur W from Mobay Corporation, along with 0.60 g of dibutyltin dilaurate, were added to the flask and the reaction mixture was heated in an 80° C. bath under nitrogen for 70 minutes to form the isocyanate terminated prepolymer. An isomeric mixture of 34.76 g (0.195 mol) of diethyltoluenediamine, obtained commercially under the trade name Ethacure 100 from Ethyl Corporation, was added to the flask along with 4.81 g of the ferric chloride-diethylene glycol conductivity control agent prepared in accordance with the procedure of Example 1. The mixture was stirred for approximately 5 minutes in an 80° C. bath, degassed under reduced pressure, and poured into a stainless steel mold. The polymer was cured in an 80° C. oven for 3.0 hours, demolded, post cured at 80° C. for 18 hours, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. The results are shown in Table II, Example 23 below.

EXAMPLE 24

This example describes the preparation of a linear, non-crosslinked 57 Durometer Shore A hardness thermoplastic polyurethane containing the conductivity control agent prepared in accordance with Example 1, but prepared in the absence of a catalyst such as previously used dibutyltin dilaurate to show that such a catalyst is not required in the preparation of the polyurethane elastomers of the present invention. However, it is believed and would be expected that the conductivity control agent itself would exert a catalytic effect on the polymerization reaction due to the presence of ferric halide in the conductivity control agent which is known in and of itself to behave as a polymerization catalyst in the synthesis of polyurethane elastomers. Also in this example, the conductivity control agent is added to the polyisocyanate prepolymer instead of the hardening mixture to demonstrate that the conductivity control agents used in preparing the polyurethane elastomers of the present invention can be added to the prepolymer instead of the hardener mixture, if desired.

A mixture of 140.0 g (0.14 mol) of commercially available poly(tetramethylene ether glycol), obtained under the trade name Terathane 1000 from E. I. DuPont de Nemours Company, ($M_n$=1000) and 2.56 g of the ferric chloride-diethylene glycol conductivity control agent prepared in accordance with the procedure of Example 1 was dried in a three-neck, 500 ml round bottom flask equipped with a Teflon blade stirrer at room temperature in vacuo (approximately 1.0 mm) for about 30 minutes. Next, 52.47 g (0.20 mol) of methylenebis(4-isocyanatecyclohexane), obtained commercially under the trade name Desmodur W from Mobay Corporation, were added to the flask and the reaction mixture was heated in an 80° C. bath under nitrogen for seventy minutes to form the isocyanate terminated propolymer. An isomeric mixture of 7.84 g (0.044 mol) of diethyltoluenediamine, obtained commercially under the trade name Ethacure 100 from Ethyl Corporation, was added to the flask. The mixture was stirred for approximately 5 minutes in an 80° C. bath, degassed under reduced pressure and poured into a stainless steel mold. The polymer was cured in an 80° C. bath for 16 hours, demolded, cooled to room temperature and the resistivities of the resultant slab molded to a thickness of 0.25 inch (0.635 cm) were measured as described above at the two designated relative humidities and the relative humidity sensitivity was determined after an equilibration time of fourteen days in a relative humidity chamber. The results are shown in Table II, Example 24 below.

TABLE II

Humidity Sensitivities of the Polyurethane Elastomers of Examples 16–24

| Examples | Resistivity at Designated Relative Humidity 0% | 100% | Time (Days) | RH Sensitivity |
|---|---|---|---|---|
| Example 16 | $7.41 \times 10^7$ | $3.60 \times 10^7$ | 14 | 2.06 |
| Comparative Example 17 | $5.90 \times 10^{12}$ | $2.22 \times 10^{11}$ | 14 | 26.58 |
| Example 18 | $2.41 \times 10^8$ | $9.42 \times 10^7$ | 14 | 2.56 |

TABLE II-continued

Humidity Sensitivities of the Polyurethane Elastomers of Examples 16–24

| Examples | Resistivity at Designated Relative Humidity 0% | 100% | Time (Days) | RH Sensitivity |
|---|---|---|---|---|
| Example 19 | $7.37 \times 10^9$ | $6.81 \times 10^9$ | 14 | 1.08 |
| Comparative Example 20 | $1.02 \times 10^{13}$ | $1.46 \times 10^{12}$ | 14 | 6.99 |
| Example 21 | $1.35 \times 10^{10}$ | $1.61 \times 10^{10}$ | 14 | 0.84 |
| Example 22 | $4.31 \times 10^8$ | $1.10 \times 10^8$ | 14 | 3.92 |
| Example 23 | $2.15 \times 10^9$ | $1.31 \times 10^9$ | 14 | 1.64 |
| Example 24 | $8.22 \times 10^7$ | $3.45 \times 10^7$ | 14 | 2.38 |

The reduction in resistivity by the use of the conductivity control agents of the invention in linear, non-crosslinked thermoplastic polyurethane elastomers, as well as the resulting reduction in RH sensitivity, is clearly shown in Table II by comparing the resistivities and the RH sensitivities of the polyurethane elastomers of Comparative Examples 17 and 20, without a conductivity control agent of the present invention, to the resistivities and the RH sensitivities of the polyurethane elastomers of Examples 16 and 19, respectively, consisting of the same polyurethane elastomers of Examples 17 and 20, but containing a conductivity control agent of the present invention. Further, Example 24 shows that polyurethane elastomers of the present invention can be prepared in the absence of a catalyst and still possess the resistivities and RH sensitivities desired of the polyurethane elastomers of the present invention.

The polyurethane elastomers are capable of being made into shaped articles such as transfer rollers and belts in which the resistivity can be maintained at from about $1.0 \times 10^7$ to about $5.0 \times 10^{10}$ ohm cm. Such shaped articles exhibit toughness, high elongation, high tensile strength, high tear strength and excellent abrasion resistance. The shaped articles can be designed to have a hardness ranging from 10 Shore A to about 80 Shore D. For use in making electrically biasable transfer rollers and belts, a Shore hardness of about 15–100 Shore A Durometers is preferred.

Method of Making Transfer Rollers

Transfer rollers can be made from any one of a number of commercially available polyurethane two-component mixes to which a conductivity control agent of the invention is added. Examples include CONATHANE TU-400, CONATHANE TU-500 and CONATHANE TU-900 to which a polyol conductivity control agent of the present invention, for example, can be added at between about 0.001 and 5.0% by weight of the total weight of the hardener composition of Part B of the mix. This results in a roller resistivity from about $1.0 \times 10^7$ to about $5.0 \times 10^{10}$ ohm cm. In general, the polyurethanes used are the two-component types comprising A and B. Part A is the isocyanate prepolymer. Part B is the hardener. The conductivity control agent typically is added to Part B of the mix. The preparation shown below is typical for a roller requiring approximately one liter of polyurethane and 0.13% conductivity control agent to make a roller with a resistivity of $2.0 \times 10^8$ ohm cm.

EXAMPLE 25

Preparation of a 10 Durometer Shore A Hardness Polyurethane Antistatic Roller

To a 500 ml resin kettle containing 116.25 g (0.058 mol) of poly(propylene glycol), $M_n=2000$, there was added, with stirring, 0.36 g of the ferric chloride-diethylene glycol conductivity control agent prepared according to the procedure described in Example 1. The mixture was stirred until homogenous. Next, 39.47 g (0.15 mol) of methylenebis(4-isocyanatocyclohexane), obtained commercially from Mobay Corporation under the trade name Desmodur W, were added to the flask and the reaction mixture was stirred at 80° C. for seventy minutes. Following this, 116.25 g (0.058 mol) poly(propylene glycol) and 2.94 g (0.017 mol) of an isomeric mixture of diethyltoluenediamine, obtained commercially as Ethacure 100 from Ethyl Corporation, were added to the reaction mixture and the reaction mixture was stirred for five minutes, under nitrogen, degassed under reduced pressure, poured into a cylindrical roller mold in the shape of a cylinder containing a centered 0.25 inch shaft and cured at 80° C. in an oven for sixteen hours. The mold and casting were then cooled to room temperature after which the casting was removed from the mold.

The dimensions of the conductive roller are dictated by the design of the copy equipment into which the rollers or belts are to be incorporated.

Although Applicants have referred to the biasable member coating materials of the invention throughout as polyurethane materials, it is to be understood that in the strictest sense, when a polyamine is present in the hardening composition, the resultant elastomeric material is comprised of a polyurethane/polyurea elastomer.

The invention has been described in detail with particular reference to preferred embodiments thereof, but it will be understood that variations and modifications can be effected within the spirit and scope of the invention.

We claim:

1. A member for electrically cooperating with a conductive support surface to attract charged toner particles from the surface towards the member comprising a conductive substrate capable of supporting a uniform bias potential thereon and at least one coating comprising a resilient elastomeric polyurethane formed by reacting:
   (a) a polyisocyanate prepolymer comprising the reaction product of:
      (i) a saturated aliphatic polyisocyanate, a saturated cycloaliphatic polyisocyanate or an aromatic polyisocyanate; and
      (ii) a polyol free of aliphatic unsaturation; and
   (b) a hardening mixture comprising:
      (i) a polyol of (a) (ii) or a diamine free of aliphatic unsaturation thereof; and,
      (ii) as a conductivity control agent for controlling the resistivity of the elastomeric polyurethane, from 0.001 to 5.0 weight percent, based on the total weight of (b), of a complex of ethylene glycol or an oligoethylene glycol selected from the group consisting of di-, tri- and tetraethylene glycol with an ionizable ferric halide salt selected from the group consisting of ferric fluoride, ferric chloride and ferric bromide, the coating being in electrical contact with the conductive substrate and having an electrical resistivity such that the coating is capable of transmitting a bias potential from the substrate to the outer periphery of the coating.

2. The member of claim 1 wherein the elastomeric polyurethane coating has a resistivity of from about $1.0 \times 10^7$ to about $5.0 \times 10^{10}$ ohm cm.

3. The member of claim 1 wherein the elastomeric polyurethane coating has a resistivity of from about $2.0 \times 10^8$ to about $2.0 \times 10^{10}$ ohm cm.

4. The member of claim 1 wherein the elastomeric polyurethane has a hardness of between about 10 Shore A and about 80 Shore D.

5. The member of claim 1 wherein the conductive substrate having a coating of elastomeric polyurethane is formed of a conductive metal in the shape of an endless belt.

6. The member of claim 1 wherein the conductive substrate having a coating of elastomeric polyurethane is formed of a conductive metal in the shape of a roll.

7. The member of claim 1 wherein (a) the polyisocyanate in the prepolymer is methylenebis(4-isocyanatocyclohexane), hexamethylene diisocyanate or toluene diisocyanate and (b) the polyol is poly(oxyethylene glycol), poly(oxypropylene glycol), poly(tetramethylene ether glycol) or mixtures thereof.

8. The member of claim 1 wherein (a) the polyisocyanate in the prepolymer is methylenebis(4-isocyanatocyclohexane) and (b) the polyol is poly(tetramethylene ether glycol).

9. The member of claim 1 wherein the conductivity control agent is present in an amount of 0.001 to 5.0 weight percent based on the total weight of (b).

10. The member of claim 1 wherein the conductivity control agent is a complex of ferric chloride and diethylene glycol.

11. The member of claim 1 wherein the conductivity control agent is a complex of ferric chloride and tetraethylene glycol.

12. The member of claim 1 wherein the conductivity control agent for controlling the resistivity further substantially reduces the sensitivity of the resistivity to changes in relative humidity.

13. The member of claim 1 wherein the conductive support surface comprises a photoconductor.

14. A method of controlling the resistivity of a member for electrically cooperating with a conductive support surface to attract charged toner particles from the surface towards the member comprising coating a conductive substrate capable of supporting a uniform bias potential thereon with at least one layer of a resilient elastomeric polyurethane, said coating being in electrical contact with the conductive substrate and formed by reacting:
   (a) a polyisocyanate prepolymer comprising the reaction product of:
      (i) a saturated aliphatic polyisocyanate, a saturated cycloaliphatic polyisocyanate or an aromatic polyisocyanate; and
      (ii) a polyol free of aliphatic unsaturation; and (b) a hardening mixture comprising:
      (i) a polyol of (a) (ii) or a diamine free of aliphatic unsaturation, or a mixture thereof; and,
      (ii) as a conductivity control agent for controlling the resistivity of the elastomeric polyurethane, from 0.001 to 5.0 weight percent, based on the total weight of (b), of a complex of ethylene glycol or an oligoethylene glycol selected from the group consisting of di-, tri- and tetraethylene glycol with an ionizable ferric halide salt selected from the group consisting of ferric fluoride, ferric chloride and ferric bromide, whereby the elastomeric polyurethane having an altered resistivity is capable of transmitting a bias potential from the substrate to the outer periphery thereof.

15. The method of claim 14 wherein the resistivity of the elastomeric polyurethane having the conductivity control agent included therein is from about $1.0 \times 10^7$ to about $5.0 \times 10^{10}$ ohm cm.

16. The method of claim 14 wherein the resistivity of the elastomeric polyurethane having the conductivity control agent included therein is from about $2.0 \times 10^8$ to about $2.0 \times 10^{10}$ ohm cm.

17. The method of claim 14 wherein the resistivity is increased.

18. The method of claim 14 wherein the resistivity is decreased.

19. The method of claim 14 wherein the conductivity control agent is present in an amount of 0.001 to 5.0 weight percent based on the total weight of (b).

20. The method of claim 14 wherein the conductivity control agent for altering the resistivity further substantially reduces the sensitivity of the resistivity of the member to changes in relative humidity.

21. The method of claim 14 wherein (a) the polyisocyanate in the prepolymer is methylenebis(4-isocyanatocyclohexane), hexamethylene diisocyanate or toluene diisocyanate and (b) the polyol is poly(oxyethylene glycol), poly(oxypropylene glycol), poly(tetramethylene ether glycol) or mixtures thereof.

22. The method of claim 14 wherein (a) the polyisocyanate in the prepolymer is methylenebis(4-isocyanatocyclohexane) and (b) the polyol is poly(tetramethylene ether glycol).

23. The method of claim 14 wherein the conductivity control agent is a complex of ferric chloride and diethylene glycol.

24. The method of claim 14 wherein the conductivity control agent is a complex of ferric chloride and tetraethylene glycol.

25. The method of claim 14 wherein the conductive support surface comprises a photoconductor.

26. A method of preventing changes in the resistivity of members for electrically cooperating with a conductive support surface to attract charged toner particles from the surface towards the members caused by changes in relative humidity comprising applying at least one coating of a resilient elastomeric polyurethane formed by reacting:

(a) a polyisocyanate prepolymer comprising the reaction product of:
   (i) a saturated aliphatic polyisocyanate, a saturated cycloaliphatic, polyisocyanate or an aromatic polyisocyanate; and
   (ii) a polyol free of aliphatic unsaturation; and (b) a hardening mixture comprising:
   (i) a polyol of (a) (ii) or a diamine free of aliphatic unsaturation, or a mixture thereof; and,
   (ii) as a conductivity control agent for controlling the resistivity of the elastomeric polyurethane, from 0.001 to 5.0 weight percent, based on the total weight of (b), of a complex of ethylene glycol or an oligoethylene glycol selected from the group consisting of di-, tri- and tetraethylene glycol with an ionizable ferric halide salt selected from the group consisting of ferric fluoride, ferric chloride and ferric bromide, to a cylindrical core of electrically conductive material for electrically cooperating with the conductive support surface when brought into contact therewith whereby the elastomer is capable of transmitting a bias potential from the core of electrically conductive material to the outer periphery thereof and significant reductions in the sensitivity of the resistivity to changes in relative humidity occur.

27. The method of claim 26 wherein the conductivity control agent is present in an amount of 0.001 to 5.0 weight percent based on the total weight of (b).

28. The method of claim 26 wherein (a) the polyisocyanate in the prepolymer is methylenebis(4-isocyanatocyclohexane), hexamethylene diisocyanate or toluene diisocyanate, and (b) the polyol is poly(oxyethylene glycol), poly(oxypropylene glycol), poly(tetramethylene ether glycol) or mixtures thereof.

29. The method of claim 26 wherein (a) the polyisocyanate in the prepolymer is methylenebis(4-isocyanatocyclohexane) and (b) the polyol is poly(tetramethylene ether glycol).

30. The method of claim 26 wherein the conductivity control agent is a complex of ferric chloride and diethylene glycol.

31. The method of claim 26 wherein the conductivity control agent is a complex of ferric chloride and tetraethylene glycol.

32. The method of claim 26 wherein the conductive support surface comprises a photoconductor.

* * * * *

UNITED STATES PATENT AND TRADEMARK OFFICE
CERTIFICATE OF CORRECTION

PATENT NO. : 5,212,032
DATED : May 18, 1993
INVENTOR(S) : Wilson, et. al.

It is certified that error appears in the above-indentified patent and that said Letters Patent is hereby corrected as shown below:

Title page, item [57], Abstract, col. 2, line 14, "glycil" should read --glycol--.

Signed and Sealed this

Twenty-sixth Day of April, 1994

Attest:

BRUCE LEHMAN

Attesting Officer

Commissioner of Patents and Trademarks